United States Patent
Sergeev et al.

(10) Patent No.: US 9,402,275 B2
(45) Date of Patent: Jul. 26, 2016

(54) INTERCONNECTING BASE STATIONS OF A CELLULAR NETWORK VIA A TRANSPORT NETWORK

(71) Applicant: ECI TELECOM LTD., Petach Tikva (IL)

(72) Inventors: Andrew Sergeev, Kfar Saba (IL); Yakov Zimmerman, Elkana (IL); Alexander Vainshtein, Lod (IL)

(73) Assignee: ECI TELECOM LTD., Petach Tikva (IL)

( * ) Notice: Subject to any disclaimer, the term of this patent is extended or adjusted under 35 U.S.C. 154(b) by 393 days.

(21) Appl. No.: 13/901,160

(22) Filed: May 23, 2013

(65) Prior Publication Data

US 2013/0316715 A1 Nov. 28, 2013

(30) Foreign Application Priority Data

May 23, 2012 (IL) .......................................... 219940

(51) Int. Cl.
*H04W 16/18* (2009.01)
*H04W 84/04* (2009.01)
*H04W 40/20* (2009.01)
*H04W 92/04* (2009.01)

(52) U.S. Cl.
CPC ............ *H04W 84/045* (2013.01); *H04W 40/20* (2013.01); *H04W 92/045* (2013.01)

(58) Field of Classification Search
CPC .................................................... H04W 16/18
See application file for complete search history.

(56) References Cited

U.S. PATENT DOCUMENTS

| | | | | |
|---|---|---|---|---|
| 8,351,374 B2* | 1/2013 | El-Sayed | .............. | H04W 24/02 370/328 |
| 2008/0084878 A1* | 4/2008 | Akbar et al. | ................... | 370/390 |
| 2008/0232272 A1* | 9/2008 | Gelbman | .......... | H04L 29/12028 370/254 |
| 2010/0177674 A1* | 7/2010 | Aggarwal | ............... | H04L 45/02 370/312 |
| 2011/0044279 A1* | 2/2011 | Johansson | ............. | H04W 92/20 370/329 |
| 2012/0147824 A1* | 6/2012 | Van der Merwe | .... | H04W 84/02 370/329 |
| 2013/0005387 A1* | 1/2013 | Aso | ........................ | H04W 4/005 455/517 |
| 2015/0038172 A1* | 2/2015 | Sengupta et al. | .......... | 455/456.3 |

\* cited by examiner

*Primary Examiner* — Vladimir Magloire
*Assistant Examiner* — Frank Donado
(74) *Attorney, Agent, or Firm* — Browdy and Neimark, PLLC (57) ABSTRACT

A method is provided for interconnecting base stations of a cellular network via a transport network which comprises a plurality of network elements (NEs), wherein at least two of the plurality of NEs are collocated with respective base stations. The method comprises the steps of: establishing in the TN at least one proximity group that comprises a plurality of geographically adjacent NEs; establishing a logical grid connectivity between NEs that are members of the same proximity group to enable direct communications there-between, thereby enabling establishment of communications paths between base stations collocated with the at least two of the plurality of NEs, wherein that path extends via the at least two respective NEs communicating directly there-between.

15 Claims, 4 Drawing Sheets

INTERCONNECTING BASE STATIONS OF A CELLULAR NETWORK VIA A TRANSPORT NETWORK

CROSS-REFERENCE TO RELATED APPLICATIONS

This application claims priority of Israel Patent Application No. 219940, filed May 23, 2012, the disclosure of which is incorporated by reference herein in its entirety.

TECHNICAL FIELD

The present invention relates to communication networks, for example networks used as a Transport Network for Fourth Generation 4G Cellular networks, or to WiMAX networks comprising base stations (nodes B, enodeB, BTS and the like) as network elements of such networks.

BACKGROUND

In the present patent application, the term base station should be understood as a general term covering various types thereof, depending on the network at which the respective base station is operative. For example, 4G networks comprise e-nodes B (eNB), 3G network comprise nodesB, 2G networks such as WiMAX networks comprise BTS, etc.

Figure 1:
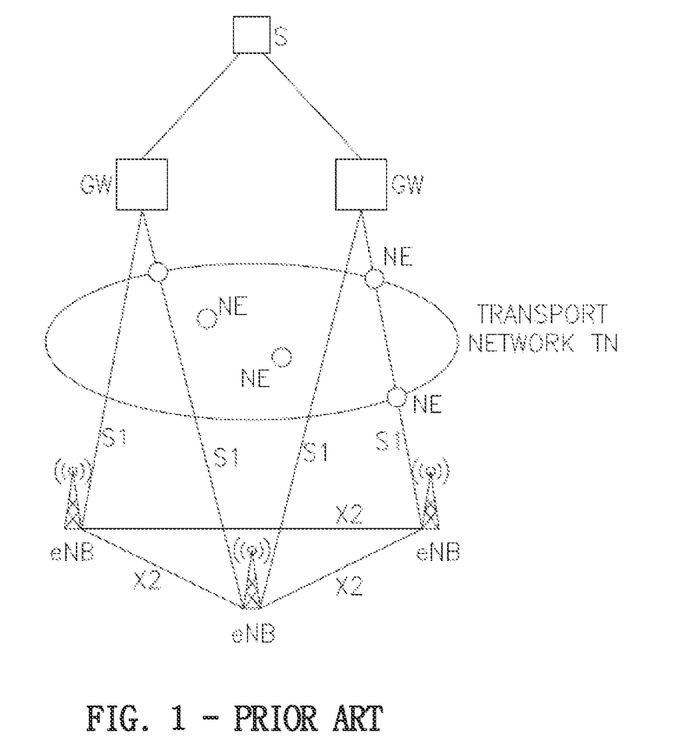
FIG. 1 (prior art) is a schematic illustration of a transport network providing full mesh connectivity for interconnecting all base stations of a cellular network with Gateways.

FIG. 1 (prior art) illustrates a cellular network comprising service gateways (GWs or SGWs) communicating with base stations (such as e-nodesB marked eNB) via a Transport Network ("TN") which assists in establishing communication links between the GWs and the base stations. For communication to be carried out between base stations (eNBs), FIG. 1 illustrates a modern network interface known as X2, associated with the Transport Network TN and adapted to connect base stations in a full mesh type of connection, thereby enabling direct communications between the elements (enBs) of the cellular network and consequently decreasing or eliminating all together the need to funnel data back and forth through service gateways SGWs. The X2 interface is a logical network element, usually formed for 4G networks in the TN (thus referred to as a cellular backhauling network) provisioned to interconnect the base stations and the gateways. The main advantages of the full mesh X2 interface are direct connectivity between adjacent eNBs and smooth handover there-between.

For communications with GWs, the base stations use so-called S1 interface connections via the same cellular backhauling network.

In modern networks, the number of enodesB (eNBs, which may be, for example, picocell or femtocell nodes) is permanently increased, and in future the number of eNBs may be increased by factor of up to 100 and even 1000. In such cases, in many real transport network implementations, the full mesh connectivity provided in the backhauling network between eNBs would become very expensive from the point of logical connections and resources required to support full mesh coverage.

Figure 2:
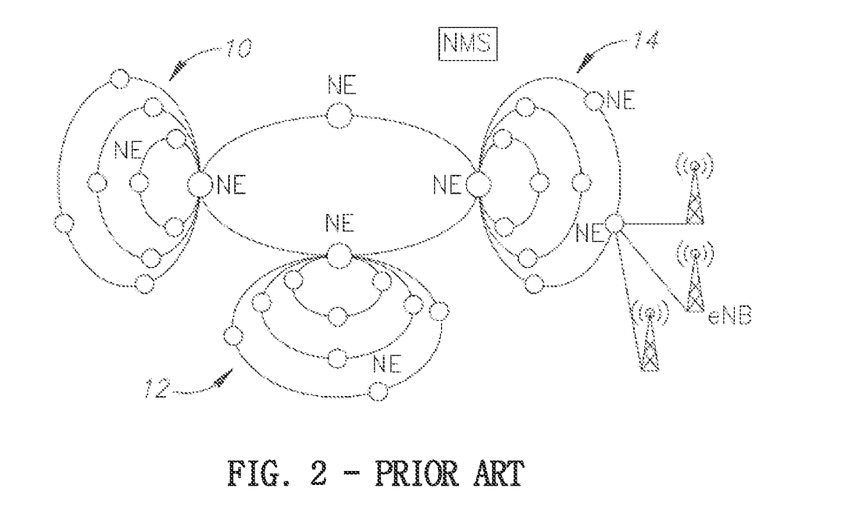
FIG. 2 (prior art) is a schematic illustration of a view from above onto a multi-domain transport network, comprising network elements collocated with base stations and Gateways of a cellular network.

FIG. 2 (prior art) illustrates a schematic top view of a plurality of network elements NEs being part of an optical fiber Transport Network. In this schematic illustration, an exemplary NE is interconnected with base stations of a cellular network. CMS of the cellular network are not shown in this Figure. The fiber transport network TN of FIG. 2 has a topology comprising a core ring network and a number of sub-networks or domains 10, 12, 14 which may be referred to as "access" domains. Each of these access domains comprises a number of ring networks (for example, fiber ring networks) of network elements (NEs, PEs), and together with other network elements of the TN, interconnect base stations of the cellular network. It is quite a common situation that direct connections are required between some nodes B and different ring networks or even different domains, but such connections cannot be reached without having full mesh connectivity in the TN. The full mesh approach turns to be too expensive due to the number of base stations, due to their long distance from one another, etc. In our example, each fiber ring consists of 4 NE or PE (Network Element or Provider Edge) elements/cards.

In FIG. 2, there are 3 "access" rings per "access network domain", and there are 3 such domains. In total, we have 4×3×3=36 NEs. Every NE should be provided with the appropriate connectivity. For each one of the N elements of the TN (backhauling network), N-1 connectivities (PWs) are required. If MPLS tunnels are counted, for the full MESH configuration, 36*(36-1) bidirectional tunnels are required. Then, pseudo wires (PWs) should be considered for each NE: for a full mesh topology, 35 PWs will be required.

According to the typical practice today, a cellular backhauling Transport Network (TN) provides two main types of connectivity for Cellular backhauling. E-tree connectivity is provided for point-to-multipoint services, while ELAN connectivity is provided for multipoint-to-multipoint services. Usually, in order to provide interconnection between eNBs and GWs, mapping of the E-tree connectivity is performed. To provide interconnection between eNBs, mapping of E-LAN (full mesh, mp-t-mp) connectivity is typically performed. Usually, these operations are performed per specific cellular network/operator (i.e., for those NEs of the TN, which serve base stations and GWs of that specific cellular operator.

US2011098046 A describes methods and an apparatus for performing a cell selection, by a multi-mode terminal, from a legacy network (2G, 3G) to an advanced network (4G). The terminal performs the cell selection upon the existence of a Base Station (BS) on the advanced network system. However, it only relates to the nodesB section of the network and does not relate to solving the problem in the transport network.

OBJECT AND SUMMARY OF THE INVENTION

The disclosure may be summarized by referring to the appended claims.

As noted above, the main problem which the present invention faces results from the growing number of enodesB which makes both the establishing and the utilizing of full mesh connectivity there-between, problematic.

It should also be noted that geographically adjacent base stations (nodes B, BTS, e-nodeB) need very often direct communication there-between. The reason being that, in a typical manner, adjacent base stations often need to perform handover to one another while establishing and then maintaining communication sessions with a mobile device (such as a cell-phone or the like) moving from one area to a geographically adjacent area served by a different base station. However, if corresponding TN nodes (network elements, NEs) belong to different networks, direct communication there-between is problematic due to the above-mentioned. disadvantages of the full mesh approach.

It is therefore the object of the present invention to provide relatively inexpensive means allowing direct communication between adjacent and neighbor base stations. The present invention is advantageous for enodesB (eNBs) of 4G cellular networks, but may be applied to other generations of cellular communication networks and to base stations operative in these networks.

In practice, base stations are problematic for intercommunication, and especially those base stations that are connected to different territorial parts/sub-networks of a transport network TN (for example, to different ring networks or to different access network domains of TN in the example illustrated in FIG. 2).

To resolve the problem, the Inventors propose using a cellular backhauling transport network TN (which may have a structure of a mesh network, a multi-domain network, a network with a number of sub-networks, etc.). The TN is usually established between the GWs and the eNBs of a cellular network to provide connection there-between. The transport network may be either radio/wireless, or fiber, or even a conventional fixed copper network. Each node (NE) of this TN is typically connected to a number of eNBs. As was mentioned, the problem is that the more base stations (for example, femto/pico eNBs) become operative, the more such NE nodes interconnections are required to be set in the TN. It is thus proposed by the solution provided according to the present invention to modify the TN, namely to improve connectivity mapping between eNBs, by replacing the full mesh connectivity with a partial mesh connectivity. To this end, the Inventors suggest establishing groups (clusters) of NEs being geographically close to one another, for example by using GPS based information by one or more of the NE nodes (collocated with a number of base stations/enodesB) to detect/determine other NE nodes that are geographically adjacent to them (and their associated base stations/enodeBs). In an example where the TN has a structure of multiple sub-networks, the GPS device will be capable to detect not only adjacent enodesB which are located within the same sub-network, but also those which are neighbors that belong to different sub-networks (for example, on different ring-networks or even neighbors located at different domains of such ring-networks).

The term "collocated" as used herein throughout the specification and claims should be understood to encompass both cases where two entities share the same physical location as well as when two entities are geographically located very near to each other.

The above-mentioned GPS device which comprises software means for proximity calculation and for forming a partial mesh grid of a geographically near-by (dose) surrounding, may be located within the NE. In addition or in the alternative, it may be distributed or duplicated between NEs and a separate centralized Network Management Entity (such as NMS, EMS, and/or an operator).

Definition of geographically close nodes in a specific system will be required for properly performing the method provided. The definition will of course comprise a criterion of proximity to be applied by the GPS device. The proximity criterion may be different for different groups and should preferably be adjustable/updatable. In addition, an operator may indicate the geographic proximity of a specific node (NE) to a reference node as being suitable or unsuitable while forming a specific cluster, even if the current proximity criterion contradicts the operator's decision.

The collocation of eNBs with an NE should be understood as positioning/status of such enodesB which are directly connected to the NE (for example, the collocated enodesB may be at the same building/transport means with the NE, or be located nearby—but should be directly connected with the NE).

Further, upon generating the clusters of the geographically close NEs based on the proximity criterion, it is preferably proposed to them a logical grid, for example a VPN (of layer 2 or layer 3) between NEs (and eNodesB) of each specific group/cluster, thereby generating a partial mesh in the TN derived from the mentioned grids. The grid in each specific group may have any topology (chain, star, ring, and even full mesh in some cases) but preferably one that forms a partial mesh connectivity between members of that specific group of NEs.

The grid can be generated by decentralized NEs or by a centralized NME for NEs of the group, for example, by forming a logical star-like structure for one or more of the NEs as a central element, based on a selected proximity criterion, and then by connecting terminal points of the "star's" beams. An alternative technique for generating the grid is possible by pruning a full mesh grid of the group and/or of the whole TN. The grid is generated to provide interconnection between adjacent NEs; the use of the generated grids, and of the partial mesh connectivity established throughout the TN is much more convenient to use than other sections in the TN.

Due to the nature of the TN (which is typically a fixed network, but may be wireless/radio based network), the above-described proposed GPS devices may be installed not only at fixed NEs, but also on mobile ones (platforms such as a tank, a truck, etc), so that the partial mesh, its criteria and its configuration may be updated when the mobile NE changes location and thus acquires another group of neighbors in the transport network TN. The operator/driver may then simply initiate a command (e.g. by striking a key on his computer inside the mobile platform), and consequently reestablish the grid portion in the new area where the platform is currently positioned.

According to another embodiment, there is provided a method for interconnecting base stations of a cellular network via a transport network TN comprising a plurality of network elements NEs, where at least two of the NEs are collocated with respective base stations, the method comprising:
  establishing in the TN at least one proximity group that comprises a plurality of geographically adjacent NEs (irrespective of whether NEs of the group belong to one or different portions or sub-networks of the NT); and
  establishing a logical grid connectivity between NEs that are members of the same proximity group to enable direct communications there-between (for example, by establishing a local VPN network in the TN, where the TN is preferably an MPLS network, and the VPN is a typical implementation of the logical grid in an MPLS network), thereby enabling establishment of communications paths between base stations collocated with the at least two of the plurality of NEs, wherein said path extends via the at least two respective NEs communicating directly there-between.

According to another embodiment, the method further comprises the step of establishing a partial mesh connectivity in the TN, based on said one or more logical grids.

In one embodiment of the solution, the TN comprises sub-networks, for example ring networks. In another embodiment, the TN is a mesh network.

The mentioned base stations may comprise one or more types selected from the following non-exhaustive list: node B, BTS, enodeB (eNB, for example including femtocell, pico-cell).

The Transport Network may be a fiber or copper fixed network or a wireless/radio network, serving as a cellular backhaul network. The TN may be an MPLS network, for example an MPLS-TP (MPLS Transport Profile) network.

The clusters (groups) of geographically adjacent NEs may preferably nut not necessarily be formed automatically, based on one or more proximity criteria. In one embodiment of the method provided, the groups may be formed by GPS-enabled NEs operative in cooperation with a Network Management Entity NME of the NT, by using the one or more proximity criteria. For example, the NME may be in the form of: NMS, EMS, NE control unit provided with a grid-forming function (such as a VPN calculation function).

To this end, the method may comprise the steps of:
providing the TN with a Network Management Entity NME having a logical group-forming and a logical grid-forming capability, such as a VPN calculation function; the logical group-forming function being based on one or more geographical proximity criteria which may be determined for/by the NME, though updatable; the geographical topology of the network may naturally be known to the NME in advance;

optionally providing at least two of the NEs with a GPS-enabled equipment (say, having a GPS unit) being in communication with the NME; such an NE with the GPS enabled equipment may be operative to detect its own geographical coordinates and/or be configured to inform the NME (for example, the NME's VPN calculation function) about its geographical coordinates) and/or be capable of detecting geographically adjacent NE(s) in its vicinity and providing the network management entity, the NME, with information that relates to the detected NE(s).

The method may further comprise performing the following operations by the network NME (using its group forming and grid-forming capabilities):

forming one or more groups (proximity groups) each associated with geographically adjacent NEs and base stations collocated therewith (regardless of whether the NEs and the base stations of the group belong to the same sub-network, "access" network, or to different sub-networks); and determining (preferably automatically) within the transport network TN, for each of the proximity groups, a Virtual Private Network VPN (for example layer 2 or layer 3 VPN) in the form of a logical grid (full mesh, partial mesh, star-like topology) generated only from the geographically adjacent NEs, for direct communication there-between.

According to another embodiment, the method further comprises a step of establishing direct communications between base stations via their NEs associated with the transport network TN and belonging to the same proximity group, using the logical grid. Optionally, the NEs may be adapted to establish direct communications there-between, independently of the operation of the cellular base stations.

One should keep in mind that the cellular network, to which the base stations belong, comprises also one or more gateways GWs. According to an embodiment of the method provided, one or more NEs per a proximity group of the TN are adapted to be in communications with one or more gateways GWs of the cellular network, thereby enabling communications between the base stations and their respective GWs. A so-called S1 interface may be formed for that purpose.

Preferably, the method may further comprise the steps:
providing additional one or more connections in the VPN for direct communications between at least one NE of each of the proximity groups and one or more gateways GWs (for example, by including in the proximity group a NE collocated with a GW), and establishing direct communications between the NEs belonging to a proximity group and their collocated base stations, and the one or more gateways GWs.

Alternatively or in addition, communications with the gateways GEs of the cellular network may be provided by creating at least one separate VPN for that purpose between the TNs and the one or more GWs. In case of such a separate VPN, the connectivity in that separate VPN will preferably be only of the type point to multipoint.

As will be appreciated by those skilled in the art, the transport network TN may serve two or more different cellular networks. For example, one and the same NE may be connected to base stations of different cellular operators. Therefore, the transport network TN may comprise different logical grids (and different VPNs) for different cellular operators. These logical grids of the different cellular operators may or may not overlap one another.

For the present description, let us define that the geographically adjacent NEs (and consequently, their collocated base stations) should be understood as:
a) adjacent NEs belong to, and typically are physically connected with one another, the same access network (fir example, by a fiber ring), and
b) neighbor NEs, which do not belong to the same access network will not have direct connection with each other, for example NEs belonging to different access networks or even to different network domains, though being geographically adjacent to one another.

Also, it should be understood that in accordance with the present invention, the distance between an NE and its collocated base station(s) is substantially smaller than a distance between two adjacent NEs in the TN. In a specific case, the NE may be a base station. The NE, being or not being a base station (enodeB), may be provided with the newly proposed GPS equipment for detecting its own geographic location, and/or for detecting geographically adjacent NEs (enBs) thereto, and/or for providing information that relates to its findings, to the NME (e.g. for forming a VPN network).

The one or more criteria used to determine geographical proximity of adjacent and/or neighboring NEs and thereby to generate the proximity groups, is preferably a pre-selected distance threshold which may be determined in advance and may be updated from time to time manually or automatically (e.g. by the NME during operation).

Figure 3A:
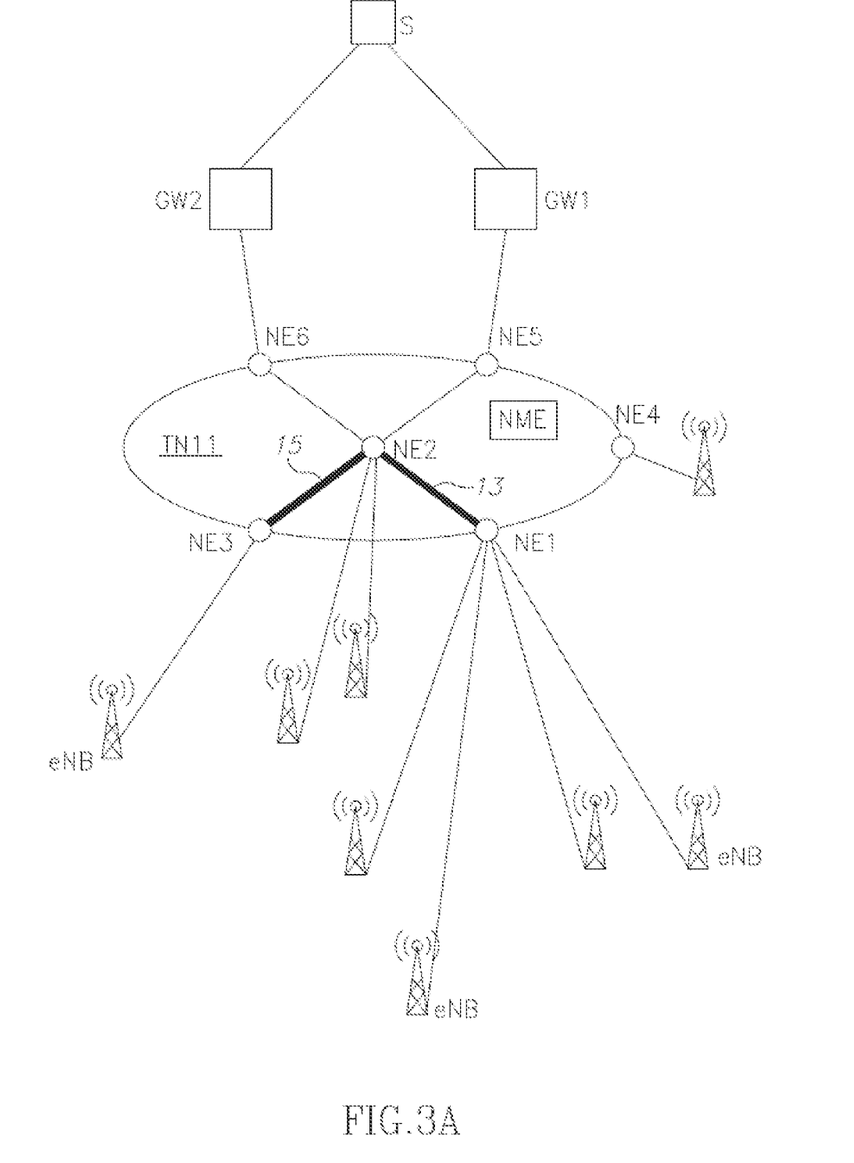
FIG. 3A illustrates schematically modification of the transport network presented in FIG. 1 in accordance with an embodiment of the present invention.
Figure 3B:
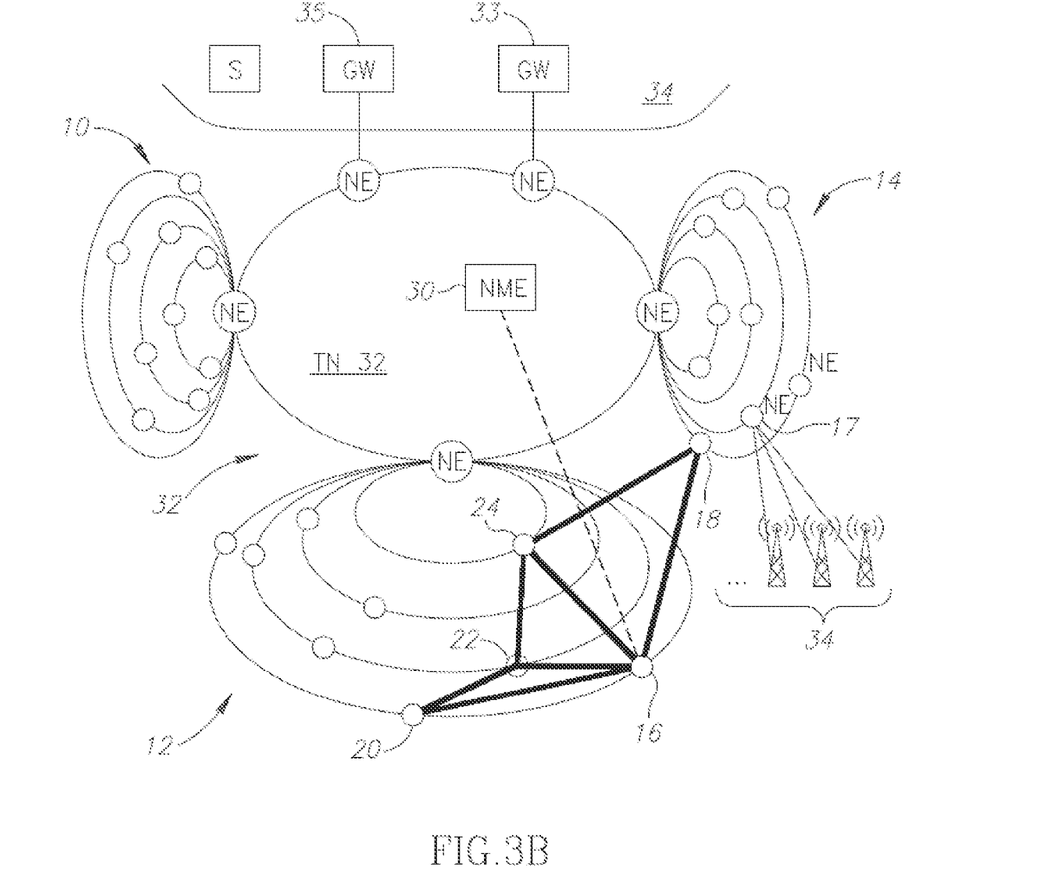
FIG. 3B illustrates schematically one implementation of the proposed concept on the example of the transport network shown in FIG. 2.

Direct communications between the geographically adjacent base stations while using the generated logical grid, such as VPN, allows MP-T-MP connectivity with minimal provisioning of network resources, and to consume less of the TN network resources. The above general concept is perfectly applicable to the example of FIG. 2, wherein the TN is a multi-domain system of ring networks (sub-networks). It should be understood by those skilled in the art that the inventive method allows direct interconnection of NEs (with their collocated base stations) that belong to one and the same sub-network, which may be considered geographically adjacent and thus become part of the proximity group and then part of the grid. However, in addition, the present invention allows the advantage of solving the problem of directly interconnecting even those NEs (with their base stations) which belong to different sub-networks (ring networks and even domains). This will be further illustrated in FIG. 3.

It should be noted that new NE(s) (and accordingly, the collocated base stations) may easily be added to a specific grid thereby becoming member(s) of the corresponding proximity group. New NE(s) may be added manually or automatically, for example by adjusting the proximity criterion in the GPS-enabled equipment of any existing node of the relevant proximity group and/or in the NME which is in communication with that group. It should also be mentioned, that any (new or existing) NE having the GPS-enabled equipment may be mobile, for example it may be placed on a movable platform such as a truck. Obviously, such NEs may easily migrate from one proximity group to another, i.e. from one of the logical grids in the TN network to another.

By yet another embodiment, the method provided further comprising a step of enabling an NE from among the plurality of NEs which is currently a member of a first proximity group, to become a member of a second proximity group.

According to still another embodiment, the NE associated with that TN is a mobile NE, and the transfer from the first proximity group to the second proximity group is carried out in response to the NE movement within the area covered by the TN.

In other words, determining the geographically adjacent NEs (which belong to the same proximity group) may be defined in advance and may always be controlled by the operator. Alternatively or in addition, the determination of the geographically adjacent NEs may be carried out automatically.

Provisioning of the VPN is preferably made automatically, by a processor located at the NME and operative to carry out VPN calculation function.

According to a second aspect of the invention, there is provided a transport network (TN) comprising a plurality of network elements NEs collocated with base stations of a cellular network, the transport network TN comprising a network management entity (NME) being adapted for selecting from among the plurality of NEs, two or more NEs to be members of at least one proximity group of geographically adjacent NEs and their collocated adjacent base stations, and to further generate for that at least one proximity group in that TN, a logical grid (partial mesh, star-like, fill mesh, chain, ring topologies) to enable carrying out inter-communications between NEs that belong to the same at least one proximity group and between base stations associated therewith. The TN may be an MPLS network, and the logical grid may be a VPN network.

Provisioning of the VPN in a generated proximity group is preferably made automatically, by a processor located at the NME and operative to carry out a VPN calculation function.

In another embodiment, two or more of the NEs are adapted to determine their geographical location and/or to determine other geographically adjacent NEs based on one or more predetermined criteria of proximity, and/or to generate reports that comprise information that relates to that the determined geographical location(s), to the NME. Such NEs may be GPS-enabled for example, provided with respective GPS devices.

In another embodiment, the NME (such as NMS, EMS, control block of the NE) is capable of establishing the proximity groups (clusters) based on one or more of the reports received from the NE(s).

In yet a further embodiment, the NME is adapted to form in each of the logical grids (VPN networks) at least one additional connection for direct communications between one or more of the GWs and one or more NEs belonging to the proximity group.

In still a further embodiment of the invention, there is provided a Network Management Entity (NME) for a transport network TN comprising a plurality of network nodes NEs collocated with base stations of a cellular network; wherein the NME being operative to establish at least one proximity group of geographically adjacent NEs, and to generate a logical grid connectivity between the NEs in a specific proximity group which in turn enables establishing direct communications only between the NEs of that specific proximity group.

By still another embodiment there is provided a Network Management Entity (NME) adapted to operate in a transport network TN comprising a plurality of network nodes NEs collocated with base stations of a cellular network; wherein the NME being operative to establish at least one proximity group of geographically adjacent NEs, and to generate a logical grid connectivity between NEs belonging to a specific proximity group (for example, by providing a VPN network in the proximity group of NEs), for establishing communications between base stations collocated with NEs that belong to the specific proximity group, via their respective NEs.

The NME may be a management entity such as NMS, EMS, and/or a control unit being integral part of the NE.

According to yet another aspect of the invention there is provided a network element NE for operation in a transport network TN comprising a network management entity NME of the TN; the NE being collocated with one or more base stations and being provided with:
 a signaling block for communicating with the NME;
 a GPS device operative to detect geographical position of said NE and/or to detect one or more other NEs having adjacent geographical location to the NE; and
 a reporting means operative to convey information detected by the GPS device towards the NME.

According to another embodiment, the NE further comprising the NME, wherein the NME is operative to establish a proximity group of NEs geographically adjacent to said NE, and to generate a logical grid connectivity between the geographically adjacent NEs being members of the proximity group, for establishing communications between base stations associated with the NEs of the proximity group via their respective NEs.

The NE may further be provided with an interface block capable of supporting communication via a logical grid in the form of a VPN whenever generated by the NME between said NE and other NE(s) geographically close to the NE, for direct communication between base stations of a cellular network collocated with the NE and the other NE(s). The interface block may further be capable of supporting one or more communication lines between said NE and one or more GWs of the cellular network.

In one embodiment, the NME may be a control unit of the NE, where the signaling block is an internal block of the control unit; the NME of said NE is adapted to form a proximity group comprising the NE and other NE(s) geographically close to said NE, and to create in said TN, for said group only, a VPN network in the form of a grid (partial mesh/star-like topology, full mesh) suitable for direct communication of the NEs and their base stations in the proximity group.

In one specific embodiment, said NE may be a base station (nodeB, BTS, eNB such as a device for a femto/pico cell, and the like). In yet another embodiment, the NE may be a movable platform, thereby adapted to move from one proximity group to another.

According to yet a further aspect of the invention there is provided a computer program product encoding a computer program stored on a non-transitory computer readable storage medium for executing a set of instructions by a computer system comprising one or more computer processors for carrying out the proposed method.

The software product may be distributed between the NME and the NEs, while it may be fully accommodated in an NE in case the NE comprises the NME as one of its internal block. Alternatively, the software product may be completely accommodated in an NME such as NMS, EMS in case the NE is not GPS-enabled and does not comprise a processor for carrying out a VPN forming functionality.

BRIEF DESCRIPTION OF THE DRAWINGS:

A better understanding of the present invention may be obtained when the following non-limiting detailed description and examples are considered in conjunction with the accompanying drawings wherein.

DETAILED DESCRIPTION OF PREFERRED EMBODIMENTS

FIGS. 1 and 2 have been discussed above in the Background section.

FIG. 3A presents a transport network TN 11, modified in accordance with an embodiment of the invention for providing a partial mesh connectivity to enable direct communications between geographically adjacent base stations BS, and to enable their connection with gateways GWs of the cellular network shown in FIG. 1. One group of geographically adjacent transport network NEs with their associated base stations are interconnected by using a logical grid in the form of a chain in the TN. The chain-like grid is shown as a solid line consisting of line sections 13, 15. The TN is provided with a management entity (NME) responsible for establishing the proximity groups and provisioning the logical grids. The NME may be centralized, such as NMS, or decentralized and placed in a number of EMSs and/or control units of NEs. If the TN is an MPLS network, the logical grid may be a VPN established by the NME in the selected proximity group. The logical grid forms a partial mesh configuration between geographically adjacent network elements NE1, NE3, Ne3 of TN 11, which are collocated with the members of a group of adjacent base stations thereto. A remote network NE4 with its base station does not belong to the group that consists of NE1, NE2, NE3, and thus the logical grid does not include NE4. NE4 may in turn be a member that belongs to another group (not shown in the figure). However, in case a proximity criterion would at some point be adjusted (e.g. extended), NE4 may then become a member of the proximity group that presently consists of NE1, NE2, NE3.

A similar procedure may be performed to include network element NE5 and/or NE6 within that proximity group. Indeed, since NE5 is collocated with (and directly connected to) GW1, NE5 may be artificially added to the proximity group of NE1, NE2, NE3 and thus to form a combined VPN so as to interconnect the members of the proximity group with GW1. The type of connectivity in such a group may be somewhat complex, for example including both MPtNIP and PtMP type of communications. Alternatively, any of the GWs may be connected to the TN using a conventional E-TREE service with PtMP connectivity, without being included as a member of any of the proximity groups. It should be noted however that both these approaches may be used simultaneously within the TN, depending on specific topology of the TN and specific capabilities of its NEs and NME.

At least one NE of each proximity group in the TN is connected to one or more gateways of the cellular network (NE2 is connected to both of the GWs).

FIG. 3B illustrates schematically modification of the transport network TN demonstrated in FIG. 2, wherein the modification has been carried out according to the present invention, by establishing a local logical grid (a partial mesh) for direct communications between members of a group of geographically adjacent NEs. The modified TN is designated by 32.

Each of the NEs (presented as circles in the ring networks of the NT) may be connected with one or more collocated base stations (only one NE 17 is shown with its collocated base stations, though each one of the NEs may have such or different arrangement).

The GPS-enabled NE described herein is presented as a black circle designated 16. It constitutes a part of one of the ring networks of a sub network/domain 12, but owing to the GPS capability of NE 16, it can detect at least its own geographical position and report it to the NME (30). Let us now assume that in this example NE 16 is also able to detect its geographically adjacent NEs 18, 20, 22 and 24 and it adapted to forward information that relates to these NEs, to NME 30 (the signaling connection between 16 and 30 is presented by a dotted line). It should also be noted that NEs 20 and 24 belong to different ring networks, while NE 18 belongs to a different access domain 14 (whereas NE 16 belongs to domain 12), As was previously noted, the transport network TN 32 (for example, being a so-called cellular backhaul for a 4G cellular network) is placed between the level of base stations and the level of gateways GW1, GW2, . . . of that cellular network. The TN actually "covers" the base stations since those nodes to which the base stations are connected, are nodes/NEs of the transport network 32. TN 32 is managed by NME 30 which, in this example, is a Network Management System. The TN is preferably an MPLS network.

According to an embodiment of the present invention, proximity groups (clusters) of geographically adjacent NEs are established and are then used in constructing in TN 32 a number of local logical grids for these groups, to allow direct communications between members of each of these groups, thereby enabling easy interconnection between adjacent base stations.

A local logical grid (for example, a star-like topology web) is shown in the group that comprises NEs 16, 18, 10, 22 and 24, by solid lines extending between the listed NEs and is used for establishing a logical VPN for providing Ethernet MptMP services by directly connecting the members of the group.

Another local logical grid may be established in a similar manner between another group of NEs. Preferably, the logical grids cover partial mesh connectivity areas, though a specific grid may appear to cover a full mesh connectivity area (for example, if a logical grid is established between three NEs). The proximity groups are provisioned based on predetermined proximity criteria (the criteria may be different for different groups, and may optionally be updatable).

While the step of establishing the proximity groups may be either automatic or not, the step of arranging the VPNs based on the logical grids associated with the proximity groups is typically carried out automatically. It may be performed in the NME autonomously, just by processing information about geographically adjacent NEs. It should be noted that "proximity" information may be introduced into the NME in advance, for example by the operator. Alternatively, the VPN arrangement may be initiated by an NE (say, by NE16), based on automatically determining by NE16 the geographic proximity of another NE with its collocated base stations. The NE16 and/or NME 30 should be configured to use a predetermined criterion of proximity, which may be periodically updated from time to time. The GPS—enabled equipment (hardware and/or software) of NE 16 may inform the network management entity NME 30 (see the dotted line) of the determination made, and the NME establishes a group of geographically adjacent NEs (and their base stations) based on that predetermined criterion of proximity. Upon establishing such a group, the NME establishes a VPN network being a logical network within the TN 32, shown by solid lines (radially outgoing from NE16 and then optionally "closed" to form a web shape). The grid shown in FIG. 39 is in the form of a partial mesh extending between the members of the group for enabling direct communications there-between.

For communicating with GWs of the cellular network, connections between network elements of the TN and one or more of the GWs may be established conventionally, for example by building a separate E-tree VPN for each GW. The NME 30 may be responsible for establishing communications between a specific proximity group (cluster) and one or more gateways GWs. To do that, a second type of the VPN network (E-tree, not shown) may be formed in the TN for direct communications between the NEs of the proximity group and GWs of the cellular network. Alternatively or in addition, at least one NE of each proximity group may be a NE that is directly interconnected (e.g. collocated) with one or more of GWs 33, 35 of the cellular network 34 (schematically presented in the upper portion of the drawing). Base stations of the cellular network 34 thus become connected to the cellular network gateways GWs via TN 32.

For the example of FIG. 3B, if one were to consider the proposed grid configuration only for a group of geographically adjacent NEs (and their enodesB), and if there are only 4 NEs in such a group, then 32*4 tunnels would have been required for enabling direct communications between NEs (for a full mesh configuration in the whole network system shown in FIG. 2, 36*(36-1) tunnels were needed). When the number of pseudo wires is considered for each NE (enodeB), for a full mesh configuration—35 PWs are required, while for the grid—4~6 PWs would be enough. Assuming that base stations collocated with a specific NE are directly connected with it by a short fixed connection (e.g. a copper cable or an optical fiber) or by a short radio/wireless link, and can thus be considered to have the same direct connections to other NE(s) of the group or to GW(s), as the specific NE has. The same meaning applies to a GW being "collocated" with a specific NE of the TN.

Figure 4:
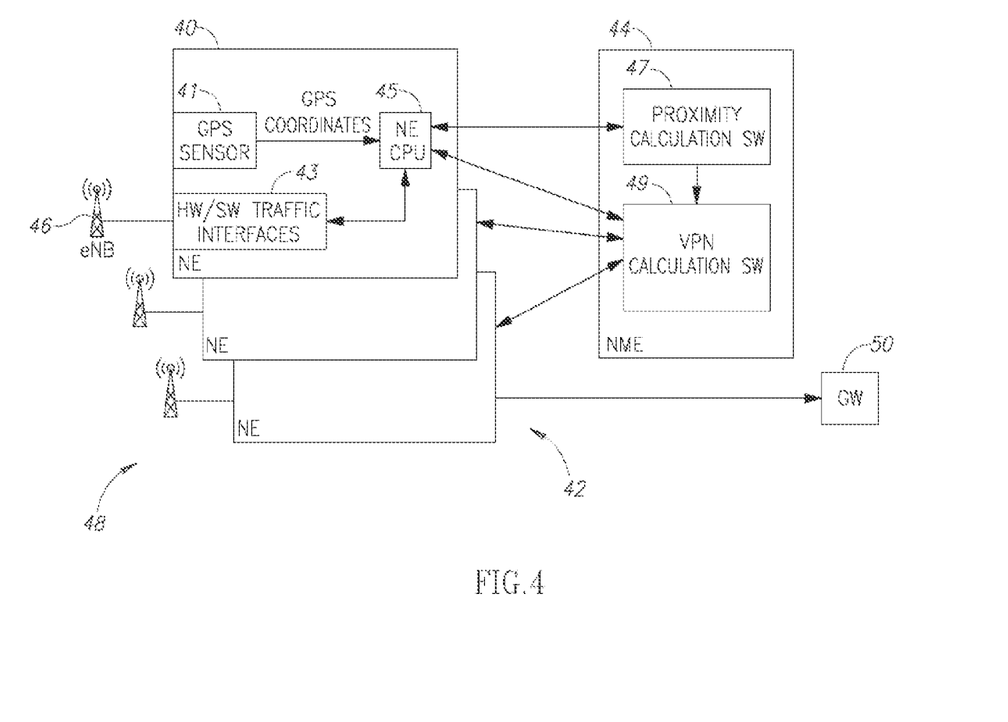
FIG. 4 illustrates schematically a block-diagram of a network element NE modified to become part of the novel transport network TN, and a modified NME of the transport network.

FIG. 4 presents a schematic block diagram of an exemplary NE (40) according to an embodiment of the present invention, being part of a proposed new MPLS transport network TN 42, and a simplified block diagram of a modified Management Entity NME 44 of that TN. In this embodiment, the NME may be a Network Management System (NMS) or an Elements Management System (EMS) of the TN. The network elements NEs are connected to their collocated base stations belonging to a cellular network (in FIG. 4, the cellular network is designated by 48, and NE 40 is connected to eNB 46).

The embodiment of NE 40 that is presented FIG. 4 comprises a GPS device 41, a hardware block 43 of traffic interfaces for forwarding data, and a Control Processing Unit 45 of the network element. Interfaces block 43 supports communications of the node 40 with NEs of the transport network, with the collocated base stations, with gateways of the cellular network 48 (one GW 50 is shown), and also supports the signaling communications between NE 40 and NME 44.

In the illustrated embodiment, the network element 40 determines its own geographic coordinates based on GPS information retrieved, and optionally coordinates of other network elements of the TN 42 located in its vicinity. The location information is fed to the control unit CPU 45 of the network element, from which it is transferred to NME 44 along a signaling channel. CPU 45 may apply local proximity criteria to the information about neighboring NEs before sending it to the NME 44, but in the alternative, it may transfer the information as is In the NME, the information generated (and sent) by CPU 45 is received at a new SW unit 47 for proximity calculation (for establishing the proximity groups), and at a new software unit 49 for VPN calculation. Block 47 is responsible for applying additional or updated proximity criteria, if required, to the information retrieved from block45. The proximity criteria of the network may be updated by the operator, for example to include in a specific proximity group a NE that has no GPS device, and/or a NE connected with a GW of the cellular network of interest. Based on the received information and the updated proximity criteria and/or by using operator's direct instructions, block 47 forms a proximity group of the NEs which are considered adjacent/neighboring to NE 40. Based on that, block 49 calculates a VPN network that covers with a logical grid only the proximity group in the TN to which NE 40 belongs. The calculated VPN related data is returned from the NME to CPU 45 of NE 40, as well as to other members that belong to its proximity group.

In NE 40, the VPN data calculated for that NE is used to configure the HW/SW interfaces' unit 43 in order to establish the logical grid between NE 40 and other NEs being members of its proximity group, in order to enable direct communications between the group members. This operation allows interconnecting only the base stations of the geographically adjacent NEs.

Other proximity groups for the same cellular network (e.g., of the same cellular operator) may be established in the TN 42 by the NME 44, and in this case respective grids of VPN networks will be provisioned for these groups. The grids (VPN networks) of one or more of the established proximity groups form a partial mesh in transport network TN 42.

Moreover, as has already been mentioned, the transport network TN may serve two or more different cellular networks. For example, one and the same NE may be connected to base stations of different cellular operators. Therefore, the transport network TN may comprise different grids (and different VPNs) for different cellular operators, and these grids may or may not overlap one another.

It should also be noted that, in an alternative embodiment, the NME 44 may be part of the NE's CPU 45, and the NEs (i.e., their CPUs) may then communicate with one another by exchanging signaling information, for establishing the proximity groups and thus forming the logical grids there-between.

While the invention has been described with reference to a number of specific embodiments, it should be appreciated that other, modified implementations of the proposed method, the suggested Transport Network, its modified Network Elements and its Network Management Entity may be provided, which should be considered part of the invention whenever defined by the claims which follow.

The invention claimed is:

1. A method for interconnecting base stations of a cellular network via a transport network TN including a plurality of network elements NEs, where at least two of the plurality of NEs are collocated each with a respective base station, the method comprising:
    establishing in the TN, when the TN is a Multiprotocol Label Switching (MPLS) network, at least one proximity group that contains a plurality of geographically adjacent NEs, and wherein the at least two NEs, including a first and second NEs collocated with the respective base stations, are members of a same of the at least one proximity group that meet a proximity criteria;
    establishing a logical grid connectivity associated with a current Virtual Private Network (VPN) between the NEs that are members of the same proximity group, wherein the local grid enables direct communications between members of the same proximity group;
    establishing at least one communications path between the respective base stations collocated with the at least two of the plurality of NEs, wherein said at least one communications path extends via the at least two respective NEs communicating directly with each other; and
    in response to updating of the proximity criteria, forming a proximity group including NEs that are adjacent to an NE that is used to generate VPN related data based on geographical coordinate information of both the adjacent NEs and the NE used to generate the VPN related data,
    where the VPN data is used to establish a logical grid that enables interconnection between those of the base stations adjacent to each other, and the logical grid is used to cover a proximity group in the TN network to which the NE associated with the VPN related data belongs.

2. The method according to claim 1, wherein the TN is a multi-domain network including a plurality of sub-networks.

3. The method according to claim 1, wherein the step of establishing in the TN at least one proximity group, comprises using information retrieved from a GPS device.

4. The method according to claim 1, wherein the base stations associated with the at least two members of the proximity group are configured to communicate with each other using the local VPN network.

5. The method according to claim 1, further comprising providing the TN with a Network Management Entity NME having a logical group-establishing and a logical grid-establishing capabilities.

6. The method according to claim 5, further comprising retrieving by at least some of the NEs GPS related information to enable determining which NEs are in a geographical proximity to each other.

7. The method according to claim 1, further comprising a step of establishing communications between two or more NEs being members of a certain proximity group of the TN and one or more gateways GWs of the cellular network.

8. The method according to claim 7, further comprising a step of establishing one or more connections in the logical grid to enable carrying out direct communications between at least one NE of each of the proximity groups and said one or more gateways GWs, thus enabling communications between the NEs of a certain proximity group, their collocated base stations, and said one or more gateways GWs.

9. The method according to claim 1, further comprising a step of enabling an NE from the plurality of NEs which is currently a member of a first proximity group, to become a member of a second proximity group.

10. The method according to claim 9, wherein the NE associated with said TN is a mobile NE, and the transfer from the first proximity group to the second proximity group is carried out in response to a movement of the mobile NE within area covered by the TN.

11. A computer program product encoding a computer program stored on a non-transitory computer readable storage medium for executing a set of instructions by a computer system comprising one or more computer processors for carrying out the method of claim 1.

12. A Multiprotocol Label Switching (MPLS) transport network, TN, comprising:
    a plurality of network elements (NEs), wherein each of at least two of the plurality of NEs are collocated with a respective base station of a cellular network,
    a network management entity (NME) configured to:
    select from among said plurality of NEs, two or more geographically adjacent NEs to be members of a same proximity group of NEs that meet a proximity criteria,
    generate in said TN a logical grid associated with a current Virtual Private Network (VPN) to enable exchanging communications between two base stations that are collocated with two members of the proximity group, wherein said communications are exchanged along a communications path that extends via two members of the proximity group communicating directly with each other, and
    in response to updating of the proximity criteria, form a proximity group including NEs that are adjacent to an NE that is used to generate VPN related data based on geographical coordinate information of both the adjacent NEs and the NE used to generate the VPN related data,
    where the VPN data is used to establish a logical grid that enables interconnection between those of the base stations adjacent to each other, and the logical grid is used to cover a proximity group in the TN network to which the NE associated with the VPN related data belongs.

13. A network element (NE) adapted to operate in the transport network TN of claim 12, wherein said NE is provided with:
    a signaling block for communicating with the NME;
    a GPS device operative to detect geographical position of said NE and/or to detect one or more other NEs having adjacent geographical location to the NE; and
    a reporting means operative to convey information detected by the GPS device towards the NME.

14. The transport network according to claim 12 configured to serve two or more different cellular networks.

15. A Network Management Entity (NME) adapted to operate in a Multiprotocol Label Switching (MPLS) transport network (TN), including a plurality of network elements (NEs) wherein at least two of the plurality of NEs are collocated each with a respective base station of a cellular network; and wherein the NME is configured to:
    select from among said plurality of NEs, two or more geographically adjacent NEs to be members of a same proximity group of NEs that meet a proximity criteria,
    generate in said TN a logical grid associated with a current Virtual Private Network (VPN) to enable exchanging communications between two base stations that are collocated with two members of the proximity group, wherein said communications are exchanged along a communications path that extends via two members of the proximity group communicating directly with each other, and in response to updating of the proximity criteria, form a proximity group including NEs that are adjacent to an NE that is used to generate VPN related data based on geographical coordinate information of both the adjacent NEs and the NE used to generate the VPN related data, where the VPN data is used to establish a logical grid that enables interconnection between those of the base stations adjacent to each other, and the logical grid is used to cover a proximity group in the TN network to which the NE associated with the VPN related data belongs.

* * * * *